Patented Mar. 29, 1949

2,465,834

UNITED STATES PATENT OFFICE 2,465,834

PREPARATION OF LEWISITE

Paul D. Bartlett, Weston, and Hyp Joseph Dauben, Jr., Cambridge, Mass., and Leonard J. Rosen, Cumberland, Md.

No Drawing. Application May 22, 1944, Serial No. 536,848

6 Claims. (Cl. 260—440)

The invention described herein may be manufactured and used by or for the Government for governmental purposes without the payment to us of any royalty thereon.

This invention relates to a method of improving catalytic syntheses typified by a union of an organic compound, such as an unsaturated hydrocarbon, with a polar or inorganic compound.

It is particularly concerned with increasing the efficiency of catalysts having moderate or low activity in the syntheses reactions for obtaining higher yield rates of desired specific products with ease of operating control.

Narrowly considered for the purpose of elucidation, an object of this invention is to provide a suitable agent for promoting the catalytic activity of a mercuric chloride catalyst in the addition reaction of an unsaturated aliphatic hydrocarbon, acetylene, with the polar inorganic compound, arsenic trichloride, to substantially increase the yield and output rate of chlorovinyldichloroarsine a war gas known as lewisite.

As in various other syntheses, the early method of preparing lewisite involved the use of anhydrous aluminum chloride as a catalyst. This catalyst has an intense activity which makes the reactions complicated and at times dangerous. With the excessively vigorous catalyst, many undesired side reactions occur, such as fission and polymerization, resulting in a degradation of the product. In the production of lewisite with anhydrous aluminum chloride, considerable heat is evolved and violent explosions may occur. The reaction leads to the formation in large quantities of undesired secondary and tertiary products, tar, and some materials which are also explosive.

Accordingly, efforts have been made to find catalysts less active than anhydrous aluminum chloride, as, for example, halides of other metals as well as the double salt, sodium-aluminum chloride. These catalysts with moderate or low activity, on the other hand, give too low a rate of reaction in a number of reactions, especially at temperatures which are sufficiently moderate for proper control and avoidance of undesired side reactions.

Prior to the discoveries leading to this invention, it was generally suspected that various metal salts present as impurities in the reactants might have a detrimental or inhibiting effect on the activity of a moderate catalyst. For example, arsenic trichloride was found to contain chlorides of iron, silicon, aluminum, antimony, mercury, bismuth, tin, etc. in small amounts. On investigating the effects of these impurities in the lewisite reaction, surprisingly a number of these same compounds proved to be promoters of catalytic activity when present in adequate amounts.

In the example of the lewisite reaction, acetylene gas passed into a stirred and heated mixture of arsenic trichloride and a solution of mercuric chloride in hydrochloric acid reacts with the arsenic trichloride to form a mixture of beta-chlorovinyldichloroarsine, bis (beta-chlorovinyl) chloroarsine, and tris (beta-chlorovinyl) arsine. Vinyl chloride and small amounts of acetaldehyde are formed as by-products.

The arsine derivatives differ by the successive addition to the arsenic trichloride of 1, 2, or 3 molecules of acetylene. The reactions are represented as follows:

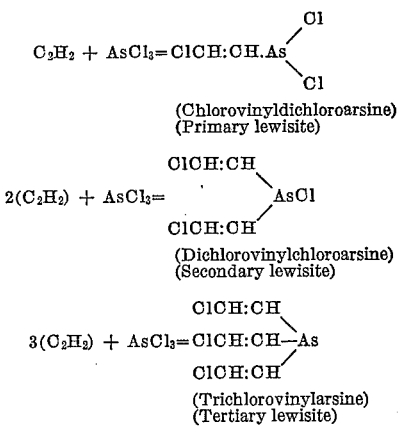

(Chlorovinyldichloroarsine)
(Primary lewisite)

(Dichlorovinylchloroarsine)
(Secondary lewisite)

(Trichlorovinylarsine)
(Tertiary lewisite)

The rate of fixation of acetylene depends on the concentrations of the mercuric chloride and hydrogen chloride, the temperature, rate of inflow of acetylene, and rate of stirring. When these factors are made constant, the inclusion of any of several metallic chlorides, as $SbCl_3$, $SbCl_5$, $FeCl_3$, $ZnCl_2$, $SnCl_4$, and $CdCl_2$, in the reaction mixture leads to increased rates of acetylene fixation with corresponding increases in the rate of formation of the products and by-products. With a catalytic solution of 60% $HgCl_2$—8% $HCl$—32% $H_2O$, approximately saturated with the separate metallic chlorides, rates of acetylene fixation at 50° C. were increased up to threefold over that of an unpromoted control run. The effectiveness of the promotion in increasing absorption rate is directly proportional to the molar concentration of the promoters in the reaction mixture.

The metallic chloride promoters are not acetylene-fixation catalysts when dissolved in hydrochloric acid and, accordingly, do not function as such in the mixture, nor are they acetylenated. The promoters function by abstracting chloride ions from combination with the mercuric chloride. Mercuric chloride in hydrochloric acid exists in the forms $Hg^{++}$, $HgCl^+$, $HgCl_2$, $HgCl_3^-$, $HgCl_4^=$ and the corresponding dimeric species. The species containing the lower ratios of Cl to Hg function as the more effective acetylene-fixation catalysts as was shown by the use of different amounts of 20% hydrochloric acid to dissolve the same amount of HgCl₂, solutions containing the lower Cl/Hg being the best catalysts. In the presence of the metallic chloride promoters, all being good chloride ion acceptors, the chloride ions are extracted from the dissolved mercuric chloride species to establish a new equilibrium mixture having a great proportion of the members with lower Cl/Hg ratios.

The promoters are not consumed by the reaction and the chloride and hydrogen ion balance is not sufficiently altered to lead to increased hydrolysis of the arsenic trichloride and its acetylenated products in the favorable cases. Increases of 10–20% in the amount of vinyl chloride formed occurs with the more easily hydrolyzed promoters.

Extensive studies have been made of the effects of the various promoters and their concentrations upon the rates and results of the reactions.

It was observed that with concentrations of about 1% and higher, based on the weight of the catalyst, the metal halides known to function as chloride-acceptors made a real increase in the accelerating absorption of the unsaturated hydrocarbon by the catalyst solution. The following table lists observed absorption rates and primary lewisite yield rates obtained when 60% HgCl₂—8% HCl—32% H₂O catalytic layers were saturated or almost saturated with the metal chloride promoters at 25° C. and the absorptions run at 45° C.:

| Met. Chlor. Promoter | None | SbCl₃ | SbCl₅ | FeCl₃ | ZnCl₂ | SnCl₄ | CdCl₂ |
|---|---|---|---|---|---|---|---|
| g. Promoter/100g. cat. soln | None | 65.4 | 32.0 | 30.9 | 15.6 | 20.4 | 8.0 |
| Av. rate in l/hr./100 g. HgCl₂ | 11.8 | 35.9 | 21.8 | 20.0 | 19.2 | 17.8 | 15.0 |
| g. Primary lewisite/hr./100 g. HgCl₂ | 68.0 | 205.3 | 102.4 | 95.0 | 97.0 | 91.2 | 92.3 |
| g. Primary lewisite/hr./l. reactor space | 245 | 739 | 369 | 342 | 349 | 328 | 332 |

There are three possible ways in which the promoters might function: (1) the promoters might themselves be acetylenated; (2) they might function as independent catalysts, supplementing the action of the mercuric chloride catalyst present; (3) they might serve as adjuncts, or promoters, for the mercuric chloride catalyst. The first possibility is ruled out by the observation that in the absence of arsenic trichloride, the only product is chlorovinylmercuric chloride, and the promoter remains almost entirely in the aqueous phase. The second possibility is eliminated since no reaction occurs without the mercuric chloride catalyst present. Therefore, the chlorides of the other metals, such as antimony chloride, act strictly as promoters for the mercuric chloride catalyst.

There is evidence to show that the rate-determining step in the preparation of primary lewisite is the union of acetylene with the mercuric chloride to give chlorovinylmercuric chloride, and that this reaction is the faster, the greater the fraction of mercuric chloride in forms other than HgCl₄⁼. The equilibria $$Hg^{++} + Cl^- \rightleftarrows HgCl^+$$

$$HgCl^+ + Cl^- \rightleftarrows HgCl_2$$

$$HgCl_2 + Cl^- \rightleftarrows HgCl_3^-$$

$$HgCl_3^- + Cl^- \rightleftarrows HgCl_4^=$$

can all be shifted to the left by any method of lowering the chloride ion concentration. Since the potency of these mercuric species as acetylene-fixation agents decreases with increasing number of chlorines attached to the mercury, a general shift of these equilibria to the left is attended by an increased catalytic effectiveness in the primary lewisite reaction. The addition of such a salt as antimony, tin, zinc, or iron chloride is one way of reducing the chloride ion concentration without reducing the acidity, since all these salts form stable complex ions with Cl⁻:

$$SbCl_3 + Cl^- \rightleftarrows SbCl_4^-$$

$$ZnCl_2 + Cl^- \rightleftarrows ZnCl_3^-$$

A similar result can be achieved by the partial replacement of the hydrochloric acid by sulfuric acid in the catalytic solution, but the chloride ion concentration is of some importance in governing the hydrolysis of arsenic trichloride and of the primary lewisite produced in the reaction, and this chloride ion concentration is more easily controlled by the use of a salt of the SbCl₃ type, which yields back chloride ion when the equilibrium is disturbed.

Solutions containing systems of this sort together with arsenic trichloride tend, on reuse, to assume a hydrochloric acid concentration characteristic of the equilibria present. In the systems under discussion, this acid concentration is lower than that initially present.

Characteristics of the effective promoters are summarized as follows: The promoters are salts or compounds of multivalent metals, preferably of metals which exist in more than one stage of oxidation. The promoters having the higher molar solubility in the catalyst solution exhibit proportionally higher absorption promoting rates. They do not precipitate out the catalyst more than a small amount. They do not undergo hydrolysis to more than a small extent. They contain a metal or positive constituent which is more electropositive than the positive metal or constituent of the catalyst and also more electropositive than the positive metal or positive constituent of the polar reactant. They do not absorb, combine or react with the organic reactant as readily as the catalyst.

The foregoing considerations are in accord with the facts that antimony trichloride is a superior promoter, zinc, stannic, and cadmium chlorides are favorable over antimony pentachloride and ferric chloride in promoting a mercuric chloride catalyst in the lewisite reaction, while phosphorus trichloride gives negative results.

Desirable properties of the promoter system besides a low vinyl chloride loss are a high rate of absorption accompanied by small loss of promoter, ease of separation of the catalyst and promoter from the product, and homogeneity of the catalytic solution at the end of the run.

The absorption rate promoting effectiveness of a good promoter, such as antimony trichloride, varies linearly with the concentration of the promoter even up to about a saturation concentration in the catalyst solution. Concentrations of antimony trichloride, expressed as grams of promoter per 100 grams of catalytic solution employed, were 2.2, 10.8, 26.0, 51.8, and 65.4. Over this concentration range there was no increase in vinyl chloride formation over that of an unpromoted controlled run, within experimental error. However, in obtaining optimum results, other factors should be balanced against the increased rate of reaction. An increased promoter concentration slightly increases the proportion of less desirable secondary lewisite and tends to increase the loss of promoter. Also increasing the ratio of the polar compound to the promoted-catalytic solution increases the loss of the promoter. Accordingly, it is desirable to keep the concentration of the promoter and of the polar reactant within optimum limits. In the mercuric chloride catalyzed lewisite reaction, satisfactory results are obtained by using about 1% of antimony trichloride in the catalytic solution and having a ratio of about 1 gram of antimony trichloride to 162 grams of arsenic trichloride.

In the event higher absorption rates are desirable, consequently with higher promoter concentrations, the promoter loss may be reduced by certain expedients. For instance, it is possible to recover all or a large part of the promoter from the product by using an extraction with a solvent, such as 18% to 20% hydrochloric acid. The hydrochloric acid solvent has the advantage of reducing the sludge content, and continued reuse of the wash solution furnishes a fairly pure recovered antimony trichloride. As another expedient, the arsenic trichloride may be used with an organic solvent, e. g., methylcyclohexane, which reduces the solubility of the promoter in the arsenic trichloride.

Other types of moderate catalysts besides mercuric chloride having the property of absorbing the unsaturated hydrocarbon, acetylene, and which are subject advantageously to a promoting action are cuprous cyanide, cuprous chloride, and mercuric cyanide. These catalysts give about the same rate of acetylene absorption as mercuric chloride in 18% hydrochloric acid at 25° C. when they are used respectively at 95°, 95° and 33° C. They likewise may be used in hydrochloric acid solutions or in solutions with other solvents as, for example, ethanolamine hydrochloride.

In using any of the catalysts, the proportions of the reactants, the proportions of the catalyst chosen, the kinds and proportions of the promoter and solvents, and the temperature may be varied within wide limits but depending upon the nature of the materials used, the product desired, and rate desired. For example, in test runs that consistently demonstrated the promoting effect of antimony trichloride on mercuric chloride, the amount of acetylene used was varied from 8,210 cc. to 27,090 cc., the mercuric chloride concentration in the hydrochloric acid solution was varied from 30 to 60%, the antimony trichloride was varied from about 2% to 52% by weight of the solution, the amount of arsenic trichloride was varied from about 108 g. to 323 g., and the temperature was varied from 24° C. to 45° C.

To summarize the characteristics of the catalysts: they are polar substances capable of readily absorbing the unsaturated hydrocarbon reactant and preferably contain a multivalent metal or positive constituent which is more electronegative than the metal or positive constituent of the polar reactant.

The specific results obtained have indicated that the efficiency of any catalyst which functions by virtue of its electron-accepting ability may be increased by the addition of a promoting substance, which possesses the same kind of electron-accepting property, preferably to a higher degree. The promoter may or may not operate as a catalyst for the original reaction, but its principal function is to absorb negative ions or groupings from the catalyst and thereby cause the latter to become a more effective catalyst.

Reactions such as addition, condensation, substitution, and rearrangement, in which the catalyst exhibits its action as the result of a transient coordination with a negative or electron-donating group, are subject to this type of promoter action. The promoters may function in either homogeneous or heterogeneous catalysis and either in liquid or vapor phase reactions.

Catalysts susceptible to the type of promoter action herein described include organic and inorganic derivatives (such as halides, cyanides, sulfates, phosphates, hydroxides, nitrates, acetates and oxides) of metals or metalloids (such as Al, B, Fe, Hg, Cd, Cu, Ag, Sb, Sn, Zn), but are not limited by these examples. The promoters are compounds of the same type but preferably bear a certain relationship to the catalyst under the reaction conditions, as previously explained, for instance, being less reactive with the unsaturated hydrocarbon or organic reactant and containing a more electropositive metal or positive constituent.

More specifically, promoters may be used in the following reactions which are catalyzed by mercury compounds: (a) addition of hydrogen halides and organic acids to acetylene in forming vinyl halides and vinyl esters; (b) addition of water (hydration) to acetylene in forming acetaldehyde.

For example, using the same conditions as those used for lewisite production, if the arsenic trichloride is omitted, chlorovinylmercuric chloride is formed as the main product and vinyl chloride as a by-product; and an inert organic solvent may be used in the process. Omission of the organic solvent leads to the formation of vinyl chloride and acetaldehyde as principal products in having the chlorovinylmercuric chloride react with aqueous hydrogen chloride as the polar reactant to give varying amounts of these products, depending on the concentration of the acid. In these syntheses, the promoter is able to increase the rate of reaction as it does in the production of lewisite by speeding up the absorption of the acetylene by the catalyst.

In a like manner, the promoter may be used with the catalyst in a two-step process wherein first an unsaturated hydrocarbon is absorbed at a promoted rate by the catalyst, and selectively so if desired at a suitable temperature, after which the catalyst absorbed hydrocarbon may be reacted with another compound.

Promoter action of the type described is also of considerable industrial importance in the addition of alcohols, ethers, anhydrides, esters, organic acid halides, hypochlorites, amines and other polar organic compounds to alkenes, alkadienes and alkynes.

Although the meanings of such terms as polar, non-polar, electropositive and electronegative are well established, a brief explanation is given herewith for clarification. It is well recognized that elements and groups of elements can be arranged in order starting with the most electropositive elements, the alkali metals, at one end and ending with the most electronegative elements, e. g., fluorine, at the other end, as in the electromotive force series. The greater the separation between the elements or groups on this scale, the greater is the ionic character of the bond between such elements or groups. On this basis there is little ionic character in C-C bonds, some in the C-H bond, still more in C-O and C-Cl bonds. Accordingly, the hydrocarbons are substantially non-polar, and many substituted organic compounds are relatively polar. A polar compound is a compound having ionic character. Also, from the described scale each element or group has a certain relationship of electropositivity or electronegativity to the others. The trivalent arsenic ion in comparison to the divalent mercuric ion is more electropositive, but more electronegative compared to ions of zinc, iron, cadmium, tin and antimony. Arsenic is more electropositive than phosphorus. Although arsenic trichloride is a polar compound, it is less polar than the described polar promoters since arsenic is closer in electronegativity to chlorine than the metals of the promoters. Accordingly, arsenic trichloride, even though inorganic, tends to exhibit properties of polar organic compounds and has a higher solubility in organic solvents than the promoters. Likewise, the preferred catalysts are less polar than the preferred promoters, thus tending to be more soluble in organic solvents than the preferred promoters.

On the basis of the foregoing description, it is to be noted that an improved synthesis of this invention involves a reaction of a substantially non-polar organic compound, such as an unsaturated hydrocarbon, and a relatively polar organic or inorganic compound, such as chlorovinyldichloroarsine or arsenic trichloride, with the intervention of a catalyst of low polarity, such as mercuric chloride, and a promoter of higher polarity, such as antimony trichloride.

While the relationship of polarity of the reactants, catalyst and promoter is a main factor of the suitability of a substance as a promoter in the reaction, there are other factors to be considered, as already explained. For instance, in an aqueous catalytic solution, the promoter is preferably a substance which does not hydrolyze too much, does not precipitate out too much of the catalyst, and does not react readily with the non-polar reactant. While each of these factors also has a relationship to polarity, the selection of a particular promoter depends upon the particular reactant, catalyst and conditions of reaction.

It is to be understood that the invention is not limited by the specific examples given for the purpose of illustration nor by any theory on the mechanism of the promoter action and that various modifications come within the spirit and scope of the invention.

We claim:

1. In the synthesis of chlorovinyldichloroarsine from acetylene and arsenic chloride, the steps comprising catalyzing the reaction with an aqueous hydrochloric acid solution of mercuric chloride, further increasing the rate of reaction by adding to the solution antimony trichloride to the extent that some of the antimony trichloride becomes dissolved in the chlorovinyl dichloroarsine product, and recovering dissolved antimony trichloride from said product by extraction with hydrochloric acid.

2. In the synthesis of chlorovinyl dichloroarsine from acetylene and arsenic chloride, the steps comprising catalyzing the reaction with an aqueous hydrochloric acid solution of mercuric chloride, further increasing the rate of reaction by adding to the solution antimony trichloride to the extent that some of the antimony trichloride becomes dissolved in the chlorovinyl dichloroarsine product and recovering dissolved antimony trichloride from said product by extraction with hydrochloric acid, said antimony chloride remaining mostly dissolved and unhydrolyzed in said solution.

3. The method of preparing chlorovinyl dichloroarsine which comprises reacting a mixture of acetylene and arsenic trichloride at a suitable reaction temperature with an aqueous solution of a mercuric chloride catalyst and a promoter selected from the group consisting of antimony trichloride, antimony pentachloride, cadmium chloride, zinc chloride, stannic chloride, and ferric chloride which remains mostly dissolved and unhydrolyzed in said solution.

4. The method of claim 2, wherein the promoter is zinc chloride.

5. The method of claim 2, wherein the promoter is stannic chloride.

6. The method of claim 2, wherein the promoter is antimony trichloride.

PAUL D. BARTLETT.
HYP JOSEPH DAUBEN, Jr.
LEONARD J. ROSEN.

REFERENCES CITED

The following references are of record in the file of this patent:

UNITED STATES PATENTS

| Number | Name | Date |
|---|---|---|
| 1,926,638 | Toussaint | Sept. 12, 1933 |
| 1,934,324 | Perkins | Nov. 7, 1933 |
| 2,183,240 | Jung | Dec. 12, 1939 |

FOREIGN PATENTS

| Number | Country | Date |
|---|---|---|
| 21,134 | Great Britain | 1913 |
| 238,520 | Great Britain | 1925 |

OTHER REFERENCES

Mann and Pope, "Jour. Chem. Soc." (London), vol. 121 (1922).